United States Patent
Boffa et al.

(10) Patent No.: US 12,380,244 B2
(45) Date of Patent: Aug. 5, 2025

(54) SYSTEMS AND METHODS FOR SECURE DATA SHARING

(71) Applicant: YALE UNIVERSITY, New Haven, CT (US)

(72) Inventors: Daniel Boffa, Branford, CT (US); Michael Fischer, Hamden, CT (US); Jonathan Hochman, West Hartford, CT (US)

(73) Assignee: Yale University, New Haven, CT (US)

( * ) Notice: Subject to any disclaimer, the term of this patent is extended or adjusted under 35 U.S.C. 154(b) by 146 days.

(21) Appl. No.: 18/057,083

(22) Filed: Nov. 18, 2022

(65) Prior Publication Data

US 2023/0153464 A1    May 18, 2023

Related U.S. Application Data

(60) Provisional application No. 63/280,955, filed on Nov. 18, 2021.

(51) Int. Cl.
| | |
|---|---|
| *G06F 21/62* | (2013.01) |
| *G06F 21/60* | (2013.01) |
| *H04L 9/06* | (2006.01) |

(52) U.S. Cl.
CPC ........ *G06F 21/6254* (2013.01); *G06F 21/602* (2013.01); *G06F 21/6227* (2013.01); *H04L 9/0643* (2013.01)

(58) Field of Classification Search
CPC .............. G06F 21/6254; G06F 21/602; G06F 21/6227; G06F 21/6245; H04L 9/0643; H04L 2209/04; H04L 9/3213
See application file for complete search history.

(56) References Cited

U.S. PATENT DOCUMENTS

| | | | | |
|---|---|---|---|---|
| 2017/0104745 | A1* | 4/2017 | Camenisch | H04L 9/085 |
| 2017/0155634 | A1* | 6/2017 | Camenisch | H04L 9/085 |
| 2019/0356475 | A1* | 11/2019 | Resch | H04L 9/085 |
| 2020/0067707 | A1* | 2/2020 | Resch | H04L 9/0841 |

OTHER PUBLICATIONS

Fischer, Michael , et al., "Invited Paper: Privacy-Preserving of Medical Data for Research", SSS 2021: 23rd International Symposium on Stabilization, Safety and Security of Distributed Systems Virtual Conference, Nov. 17-20, 2021. YouTube.

Fischer, Michael , et al., "Privacy-Preserving Data Sharing for Medical Research", Yale University Department of Computer Science, YALEU/DCS/TR-1558, Sep. 2021., pp. 1-12.

Fischer, Michael , et al., "Privacy-Preserving Data Sharing for Medical Research", Stabilization, Safety, and Security of Distributed Systems: 23rd International Symposium, SSS 2021, VirtualEvent, Nov. 17-20, 2021, Proceedings; pp. 78-89, Abstract: https://doi.org/10.1007/978-3-030-91081-5_6.

\* cited by examiner

*Primary Examiner* — Mohammad W Reza
(74) *Attorney, Agent, or Firm* — Sean Ritchie; Kathryn Doyle; Saul Ewing, LLP

(57) ABSTRACT

One aspect of the invention provides a method for secure sharing of data. The method includes: receiving, from a first computing device and by a security node for the first computing device, a hashed identifier for a data source; generating, in response to the receiving, a blinding function value dependent on the hashed identifier; and transmitting, to the first computing device, the blinding function value for storage of a set of data and linking the set of data to the data source.

20 Claims, 4 Drawing Sheets

SYSTEMS AND METHODS FOR SECURE DATA SHARING

CROSS-REFERENCE TO RELATED APPLICATION(S)

This application claims the benefit of priority under 35 U.S.C. § 119(e) to U.S. Provisional Patent Application Ser. No. 63/280,955, filed Nov. 18, 2021. The content of this application is hereby incorporated by reference herein.

BACKGROUND OF THE INVENTION

Electronic patient medical records contain vast amounts of information of potential value to researchers striving to increase understanding of diseases, treatments, and outcomes. Effective use of such data is limited by privacy and technical concerns.

SUMMARY

One aspect of the invention provides a method for secure sharing of data. The method includes: receiving, from a first computing device and by a security node for the first computing device, a hashed identifier for a data source; generating, in response to the receiving, a blinding function value dependent on the hashed identifier; and transmitting, to the first computing device, the blinding function value for storage of a set of data and linking the set of data to the data source.

This aspect of the invention can have a variety of embodiments. The method can further include applying a blinding function to the hashed identifier to generate the blinding function value. The blinding function can be of the form $b_u(x)=xg^u \bmod p$, wherein: x comprises the identifier for the data source; g comprises a primitive root value; u comprises a secret random value selected by the security node for the first computing device; and p comprises a safe prime value.

The first computing device can include a device for a healthcare provider. The data source can include a medical patient.

Another aspect of the invention provides a method for secure sharing of data. The method includes: transmitting, from a first computing device and to a security node for the first computing device, a hashed identifier for a data source; receiving, in response to the transmitting, a blinding function value dependent on the hashed identifier; and transmitting, from the first computing device to a second computing device, the blinding function value and a set of data of the data source for storage of the set of data and linking the set of data to the data source.

This aspect of the invention can have a variety of embodiments.

The method can further include generating the hashed identifier by applying a hashing function to an identifier of the data source. The hashing function can include a SHA256 hashing function. The hashing function can include a one-way hashing function.

The second computing device can include a database configured for storing medical records.

Another aspect of the invention provides a method for secure sharing of data. The method includes: receiving, from a second computing device and at a security node for the second computing device, a blinding function value for a set of data of a data source; applying, by the security node, a completion function to the blinding function value; generating an anonymous data identifier from the applying; and transmitting the anonymous data identifier to the second computing device for storage of the set of data and linking the set of data to the data source.

This aspect of the invention can have a variety of embodiments. The completion function can be of the form $c_v(y)=yg^v \bmod p$, wherein: y comprises a hashed identifier for the data source; g comprises a primitive root value; v comprises a secret random value selected by the security node for the second computing device; and p comprises a safe prime value.

Another aspect of the invention provides a method for secure sharing of data. The method includes: receiving, from a first computing device and at a second computing device, a blinding function value and a set of data of a data source; transmitting, form the second computing device to a security node of the second computing device, the blinding function value; receiving, in response to the transmitting, an anonymous data identifier for the set of data; and storing the set of data and the anonymous data identifier at the second computing device.

This aspect of the invention can have a variety of embodiments. The method can further include: identifying another set of data stored at the second computing device with the anonymous data identifier; and linking the set of data to the other set of data based on the identifying.

Another aspect of the invention provides a system for secure data sharing. The system includes: (a) a first computing device, (b) a security node for the first computing device, (c) a second computing device, and (d) a security node for the second computing device. The first computing device is configured and adapted to: transmit a hashed identifier for a data source; receive, in response to the transmitting, a blinding function value dependent on the hashed identifier; and transmit the blinding function value and a set of data of the data source for storage of the set of data and linking the set of data to the data source. The security node for the first computing device is configured and adapted to: receive, from a first computing device, the hashed identifier for the data source; generate, in response to the transmitting, the blinding function value dependent on the hashed identifier; and transmit, to the first computing device, the blinding function value. The second computing device is adapted and configured to: receive, from the first computing device the blinding function value and the set of data of the data source; transmit the blinding function value; receive, in response to the transmitting, an anonymous data identifier for the set of data; and store the set of data and the anonymous data identifier. The security node for the second computing device is configured and adapted to: receive, from the second computing device, the blinding function value for the set of data of the data source; apply a completion function to the blinding function value; generate the anonymous data identifier from the applying; and transmit the anonymous data identifier to the second computing device.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

Figure 1:
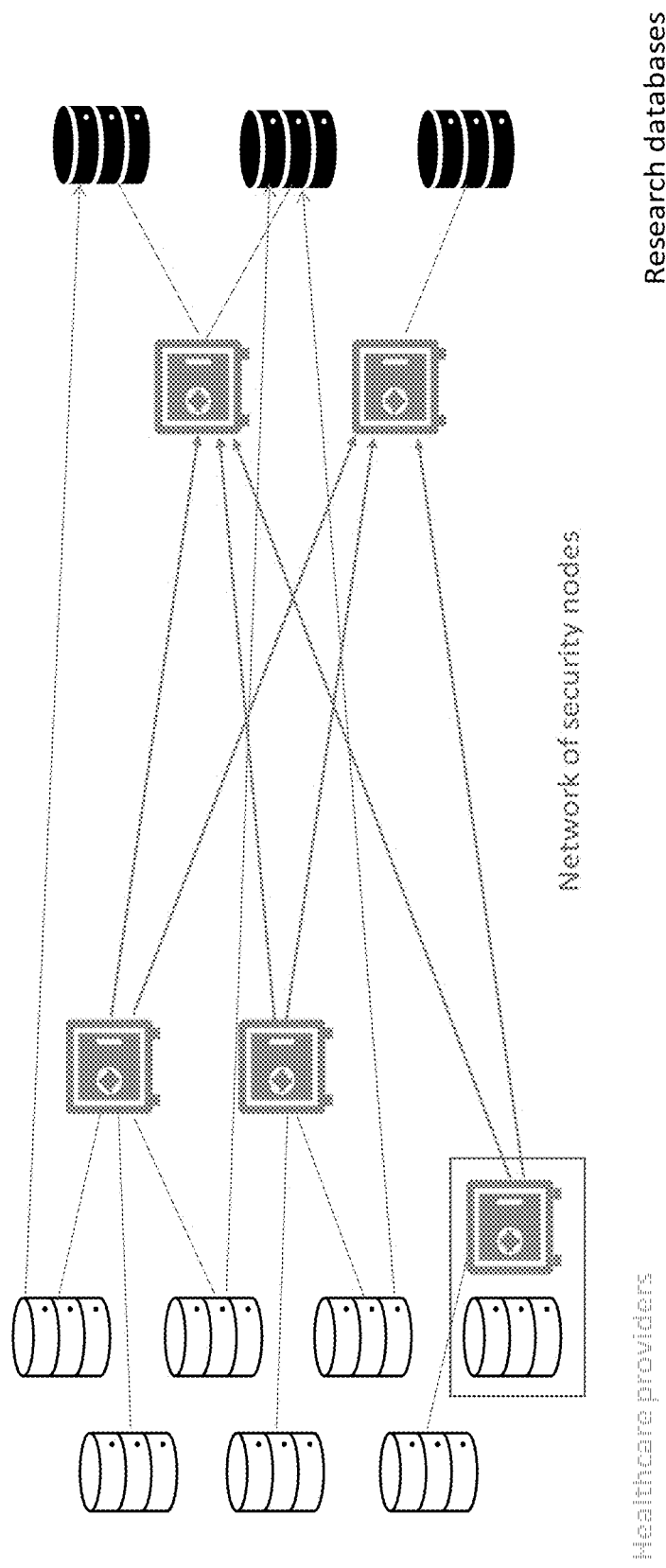
FIG. 1 depicts an exemplary network diagram according to an embodiment of the invention.
Figure 2:
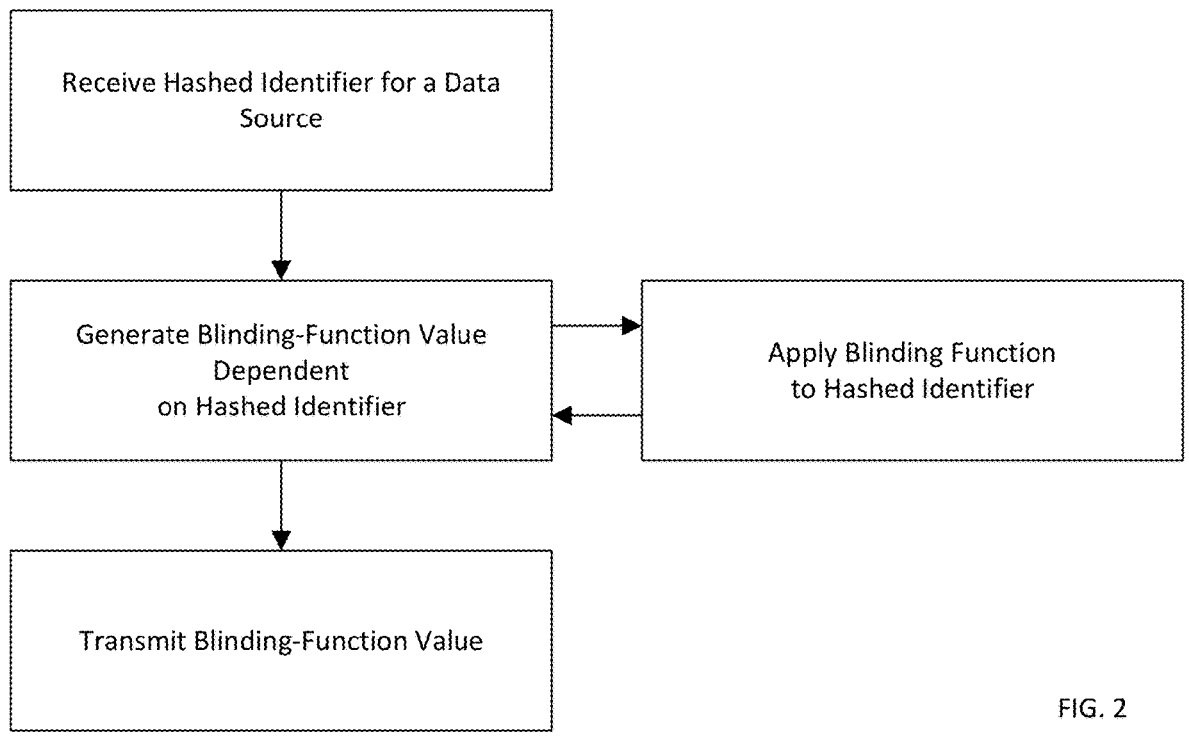
FIGS. 2-5 depicts methods for secure sharing of data according to embodiments of the invention.
Figure 3:
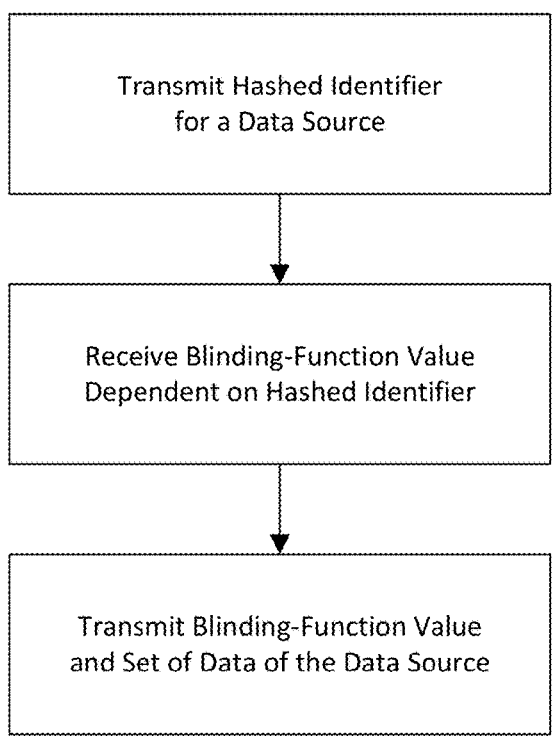
Figures 4, 5:
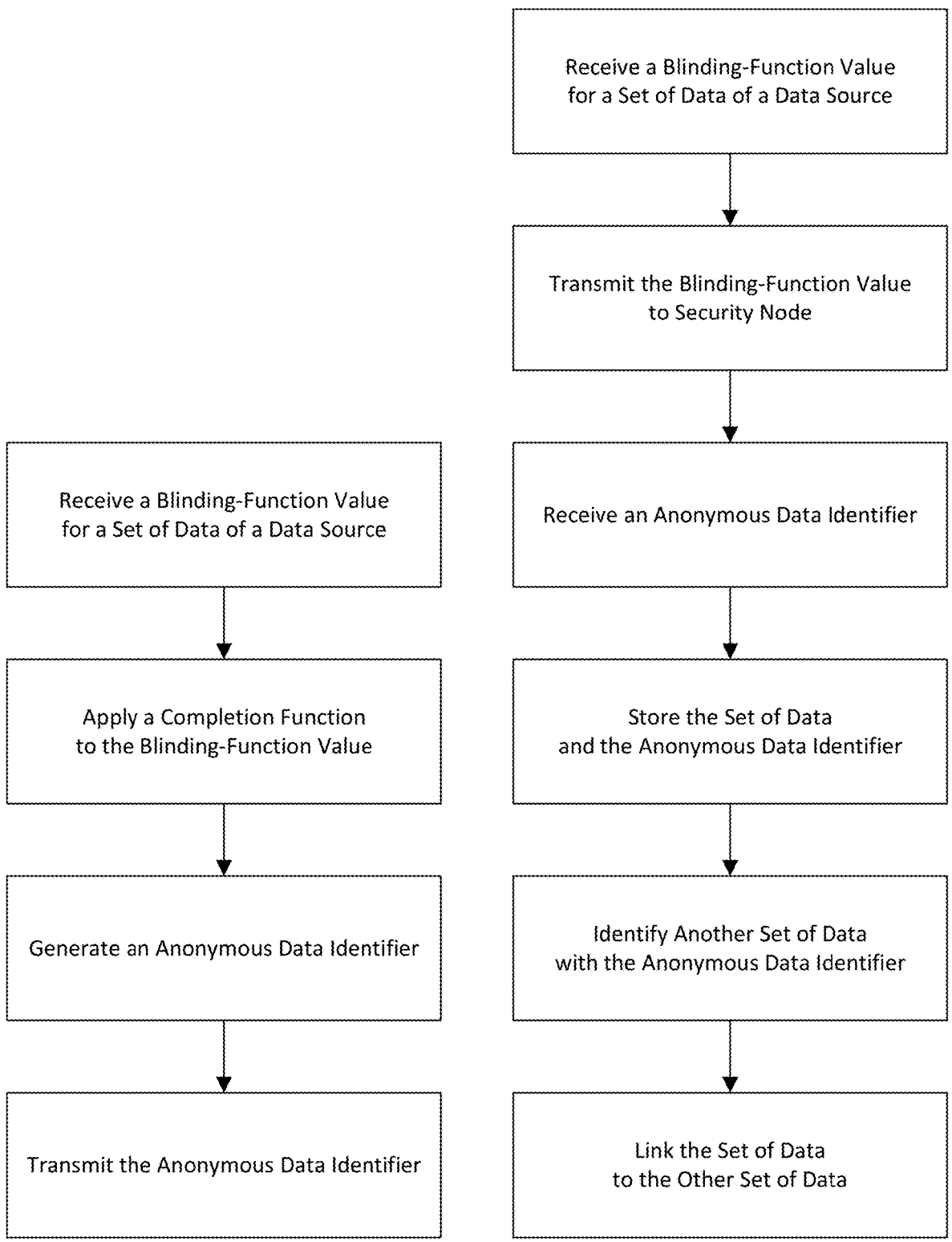
Figure 6:
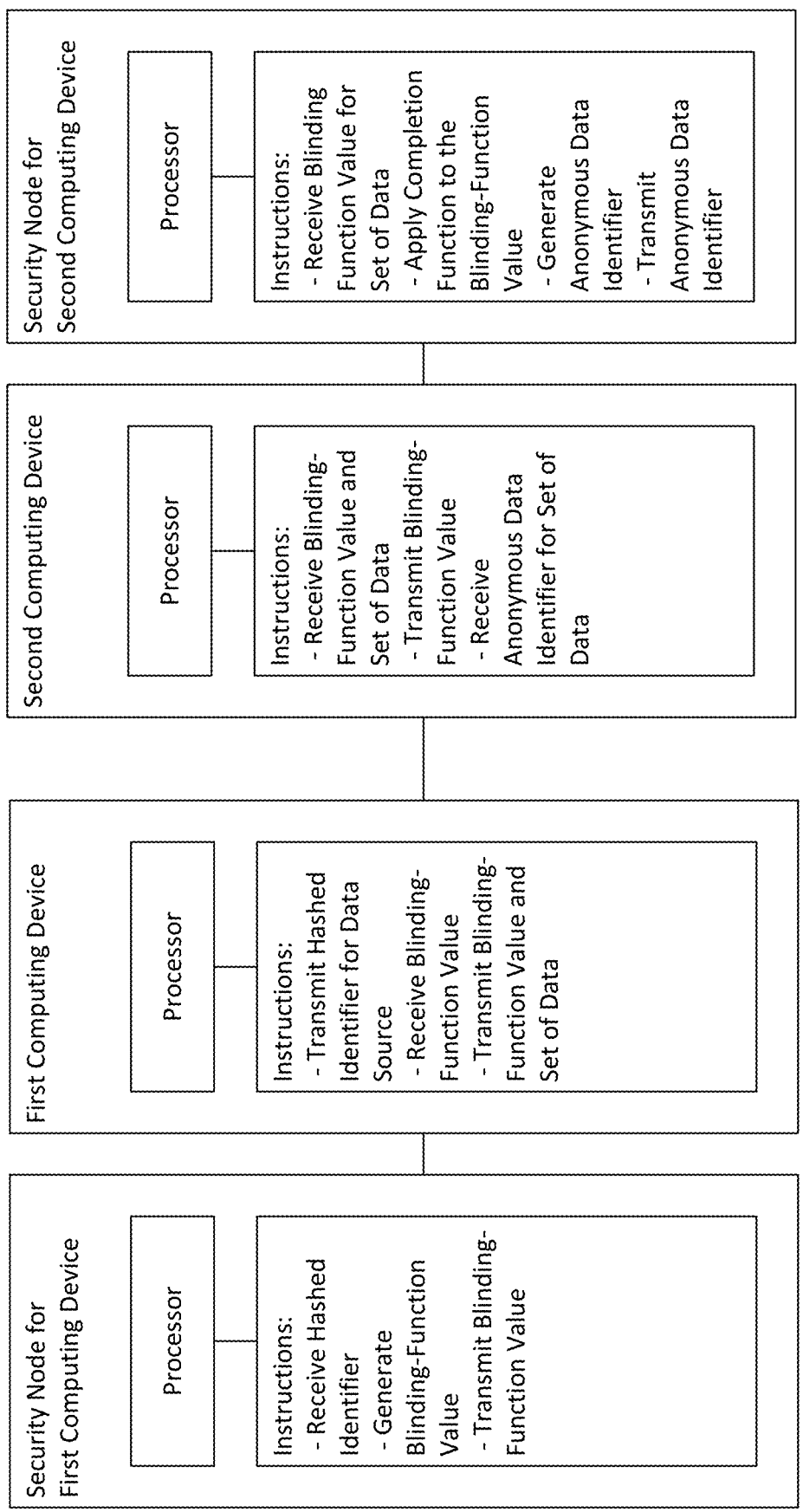
FIG. 6 depicts a system for secure data sharing according to an embodiment of the invention.

The instant invention is most clearly understood with reference to the following definitions.

As used herein, the singular form "a," "an," and "the" include plural references unless the context clearly dictates otherwise.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

DETAILED DESCRIPTION OF THE INVENTION

Electronic patient medical records contain vast amounts of information of potential value to researchers striving to increase understanding of diseases, treatments, and outcomes. Effective use of such data is limited by privacy and technical concerns. Privacy laws require the removal of Personally Identifiable Information (PII) from the released data. Technical concerns are that the data must be abstracted for consistency across different providers. To be most useful, data from different providers for the same patient must be linked together. Embodiments of the invention apply cryptographic techniques to the problem of privacy-preserving linking of medical records.

Introduction

An embodiment of the invention facilitates a system for medical data sharing that meets several criteria: (1) understandable to stakeholders, (2) supportable by stakeholders, (3) simple and explainable, (4) actionable with minimal startup investment, (5) sustainable, and (6) secure.

Embodiments of the invention provide a new cryptographic primitive, called a blinding-completion pair, which addresses the practical problem of linking anonymous medical records. Blinding-completion pairs provide a method for generating a multitude of anonymous pseudonyms for an entity, to be used by data sources, and then consolidating that multitude into a single anonymous pseudonym at the destination database. Embodiments of the invention also provide a distributed system and protocol for sharing medical data that can preserve privacy when confronted with occasional data breaches.

Medical Information Workflow

Data enters the healthcare system when a patient contacts a provider, whether a primary care physician or a hospital. At that point, the provider determines and records the patient's PII and begins or updates the patient's chart.

To curate data for statistical and research purposes, trained registrars extract select data elements from the medical record according to specific data field definitions, resulting in highly structured data sets. The datasets are then stripped of PII and exported in a de-identified manner to one or more of several national databases. Importantly, not every healthcare entity submits to every database, and each database only requests certain fragments of the patient's medical information. As a result, each patient's care is captured by the databases in a piecemeal fashion. Because the databases do not collect PII, there is no way to consistently reunite the fragments of the healthcare data back together to create a complete picture of a patient's journey through the diagnosis, treatment, and outcome of their medical condition.

The analysis of patient outcomes captured within the databases has led to dramatic improvements in the safety and effectiveness of care for almost every medical condition. However, the ability of the database research to characterize relationships between variables and outcomes in medical care is critically dependent on the breadth of information available for analysis (e.g., to control for bias and confounding effects). Because databases are only capturing fragments of the medical journey, there are limitations to the types of improvements that currently can be made with database research.

For example, the database that best captures cancer stage does not capture the specific type of chemotherapy that patients received. If there were a way to reunite all the fragments of data back together, medical research using existing databases would become far more powerful, and many more improvements would be possible.

A simple but unacceptable "solution" to the linking problem is to give each patient a universal health identifier to be included with the patient's record in each database. This is used in some other countries (e.g., Norway). However, in the United States, the topic of a national identifier has become highly polarizing, making this a less feasible option. Moreover, anyone with access to the curated databases would be able to join the several databases into one master health record for the patient with that identifier. This is often sufficient, when combined with other information readily available on the internet, to deanonymize the health record and reveal the patient's PII.

Privacy-Preserving Linking of Patient Data

Embodiments of the invention provide a new cryptographic primitive for generating identifiers that allows a database to link records from different data providers while preserving privacy in the face of many kinds of breaches.

Blinding-Completion Pairs

Let x be the identifier used by a data provider h to identify an entity. Let b(x) be a one-way hash function. A blinding-completion pair for h is a pair of one-way functions $(b_h(x), c_h(y))$ such that $b(x)=c_h(b_h(x))$ for all x, and b(x) is also one-way. Like a cryptosystem $(E_h(x), D_h(y))$, the composition of the second function in the pair with the first yields the same function for all keys h. In our case, the composition is the fixed blinding function b(x), which defines the alias $y=b(x)$ for x. While neither x nor y can be recovered from $y_h=b_h(x)$, y can be recovered from any single value $y_h$ if the corresponding completion function $c_h$ is available, since $y=c_h(y_h)$.

Implementation

There are several ways to implement blinding-completion pairs. One way is to use cryptographic accumulators. Let $Q=\{b_1, \ldots, b_N\}$ be a set of quasi-commutative cryptographic hash functions. They have the property that the N-way composition of these functions in any order yields the same function B. Hence, for any subset $S \subseteq Q$, the composition of those functions in S, call it $b_S$, can be used as the first element of a blinding-completion pair, and the composition of $b_{(Q-S)}$ becomes the completion function $c_S$. The drawback of this scheme is that N must be known in advance, and the time complexity of finding $b_S$ and $c_S$ grows with N.

Embodiments of the invention use a different scheme based on discrete logarithms. First, we introduce some standard number theory. For positive integer n, let $Z_n^*$ be the set of positive integers less than n that are relatively prime to n. The size of $Z_n^*$ is given by Euler's totient function $\phi(n)$.

In the special case that n is a prime p, $Z_p^*=\{1, \ldots, p-1\}$, so $\phi(p)=p-1$. Also, p has primitive roots. Say g is a primitive root of p if every number $a \in Z_p^*$ can be expressed as $a=g^k$ mod p for some $k \in Z_p^*$. The number k is called the discrete logarithm of a modulo p. Computing the discrete logarithm is believed to be computationally difficult when p and g are chosen carefully.

For our purposes, we choose p=2q+1, where q is a Sophie Germain prime and p is called a safe prime. Such prime pairs are widely used in cryptography, so a suitable supply exists for our purposes. An estimate of the number of Sophie Germain primes less than n is $\Theta(n/(\log n)^2)$.

There are $\phi(\phi(p))=\phi(p-1)$ primitive roots in $Z_p^*$. This makes it possible to find a primitive root g by a guess-and-check method. Guess a number $g \in Z_p^*$ and check that $g^q \equiv -1 \pmod{p}$. The expected number of guesses required to find g is $(p-1)/\phi(p-1)=O(\log \log p)$. How big is $\phi(p-1)$? Because we've chosen p-1=2q, then $\phi(p-1)=\phi(2)\phi(q)=q-1=(p-3)/2$.

Let r, u be positive integers in $Z_{\phi(p)}^*=Z_{p-1}^*$, and let v be a positive integer less than $\phi(p)$ such that $r \equiv (u+v) \mod \phi(p)$. Define $b_u(x)=xg^u$ mod p and let $c_v(y)=yg^v$ mod p. Then $(b_u, c_v)$ is a blinding-completion pair for the blinding function $b(x)=xg^r$ mod p. This follows since $$c_v(b_u(x)) \equiv c_v(xg^u) \equiv (xg^u)g^v \equiv xg^{u+v} \equiv xg^r \pmod{p}$$

The last identity follows from Euler's Theorem, which states that for $a \in Z_p^*$, $a^{\phi(p)} \equiv 1 \pmod{p}$.

The parameters p, q matter both for convenience and security. To choose r from $Z_{\phi(p)}^*$, we need to find an r that is relatively prime to (p-1). But an arbitrary p-1 might have many small factors, e.g., p=71. However, since we choose p, q so that p-1=2q, we know the only factors of p-1 are 2 and q. Choosing a safe prime p makes it easy to find random numbers in $Z_{\phi(p)}^*$. As for security, the discrete logarithm problem is hard in general, but a solution may be feasible via the Pohlig-Hellman algorithm when p-1 has no large prime factors. A safe prime does not have this weakness.

As explained in the "Proposed Workflow for Enhanced Security" section below, one can allow security nodes to independently choose random values of r, $u \in Z_{\phi(p)}^*$ and calculate $v=(r-u) \mod \phi(p)$.

Because r and u may be chosen independently by different security nodes, there is a theoretical risk of v=0, which would produce the undesirable result $y_h=y$. From the point of view of a cryptographer, such a result is not a problem, but to satisfy our design requirements, we want to provide an unqualified guarantee that the identifier used by a data provider h does not appear in a database that links its records.

The value r is secret and may not be shared, therefore the security node choosing u cannot "peek" at r to make sure it chooses a safe value for u. In practice, when p is very large, the probability of r=u is vanishingly small. Should this ever happen, a simple remedy is to choose a new value for r via key rotation, as explained next.

Key Rotation

The values of r, u, v should be rotated periodically in case they are ever compromised. We provide a sketch of how such rotation could be implemented.

To rotate the value of r, choose a random $0 \le s < \phi(p)$ and calculate $r'=(r+s) \mod \phi(p)$. Check that $r' \in Z_{\phi(p)}^*$, and if not, choose a different random s and try again. Then recalculate $v'=(r'-u) \mod \phi(p)$. Finally, to update the blinded value $y=xg^r$ mod p, calculate a new blinded value $y'=yg^s$ mod p. Note that x is not needed for this calculation. Then y' is the new blinded value for the same x, since $y' \equiv xg^r g^s \equiv xg^{r'} \pmod{p}$.

To rotate the value of u, choose a random $0 \le s < \phi(p)$ and calculate $u'=(u+s) \mod \phi(p)$. Check that $u' \in Z_{\phi(p)}^*$, and if not, choose a different random s and try again. To update the blinded value $y_h=xg^u$ mod p, calculate a new blinded value $y'_h=y_h g^s$ mod p. Then $y'_h$ is the new blinded value for the same x, since $y'_h \equiv xg^u g^s \equiv xg^{u'} \pmod{p}$.

Proposed Workflow for Enhanced Security

We propose three additions to the existing workflow to maintain security while still permitting research data sharing.

First, we envision a system of restricted local patient identifiers (LPIDs) that can be used to identify the medical records of a given patient within the context of a single healthcare provider. Local identifiers can be obtained from a patient's PII via a one-way cryptographic function. This prevents the local identifier from being reverse engineered to obtain PII.

Second, using the cryptographic technique of blinding-completion functions, the local patient identifiers for different health care providers can be used to calculate an anonymized patient identifier (APID). The APID allows a medical database to link patient records across providers while still providing no clear path to finding the corresponding PII.

Third, to further protect patient anonymity and privacy, we propose to separate the security services from the servers and databases holding the actual PII (in the case of hospitals) and medical data (in the case of curated database).

Trust

Our model of trust has two dimensions: whether the party has good intentions to keep sensitive information private, and whether the party is competent to do so. For example, while we may trust healthcare systems to do their best to keep sensitive patient information private, they are not always good at cybersecurity, as evidenced by the large number of cyber-attacks against health care organizations. Even when a healthcare system has a central information technology department capable of maintaining network security, that competency may be a scarce resource.

Our model of trust is different from traditional adversarial models that consider the worst possible outcomes from an untrusted party. Our model is informed by one author's experience in analyzing dozens of actual lawsuits related to online identity and privacy. While malice is sometimes present, incompetence is much more likely.

While healthcare providers are expected to be competent at medical treatment, there is no reason to expect them to be competent at cryptography (nor would we trust the average cryptographer to perform surgery). To mitigate the risk of healthcare providers performing cryptographic functions insecurely or leaking secret keys, embodiments of the invention can restrict access to certain functions and the secret keys that power them. To keep everyone safe, embodiments of the invention can introduce additional parties to the transaction, called "security nodes," which have demonstrated technical competence. Each healthcare provider can choose a security node to work with, and so can each medical database a depicted in FIG. 1.

A security node is a network service that can be trusted to implement cryptographic functions correctly and to hold secret keys without leaking them. Security nodes could be independently operated, or they might be operated by a department within a medical organization with the required competence. Importantly, a security node can isolate the secret keys used by cryptographic functions or for signing messages in a single location. This makes it easier to protect secret keys by storing them in specialized computing hardware, such as a hardware security module (HSM). Security nodes also provide authentication services to health care providers. Each security node can have a public-private key pair it can use to sign and authenticate messages for other security nodes. A special "executive" security node can keep a list of all security nodes and their public keys. This list may be periodically updated and distributed, enabling security nodes to reliably authenticate each other's messages.

Parties

A transaction can include six parties: (1) a patient w, who is identified with a user identifier (UID), (2) a health care provider h, who treats patients and gathers medical data, (3) the health care provider's security node that provides LPIDs that can be attached to medical data in lieu of UIDs, (4) the database's security node that attaches an APID to medical data in lieu of LPIDs, (5) a database d that collects anonymous patient profiles, identified only by APID, and (6) researchers that receive anonymous patient profiles.

Identifiers

There can be three levels of identifiers, each with distinct properties:

First, UID can be an invariant identifier, such as a name-birthday pair or a Social Security number. The UID can be readily available to the patient and widely used by health care providers. A patient's UID is preferably not shared because it constitutes PII.

Second, LPID identifies patients relative to a healthcare provider and may have no apparent connection to any PII. A patient's LPID can be different at every provider and can be used for sending anonymized records to a database.

Third, APID identifies patients relative to a database and may have no apparent connection to any PII or to any LPID. Anonymized records sent to a database by different health care providers for the same patient can be associated with the same APID, which enables record linking.

The LPID and APID identifiers can be rotated periodically to frustrate any attacker who manages to breach the system. Rotation can be done if a breach is detected, or on a regular schedule to limit the damage from an undetected breach, and to provide other benefits.

Initialization

Initially, one or more databases join our proposed system, which provides the values p, q, and g. Each database d can choose a security node, which generates a random value $r_d$ such that $r_d \in Z_{\phi(p)}^*$. The value $r_d$ is used to generate blinding-completion function pairs and can be kept secret. Each healthcare provider h joining the system can choose a security node. The healthcare provider can obtain a public-private key pair for signing messages (e.g., an X.509 security certificate), using a digital signature algorithm such as DSA or ECDSA, and verifying the healthcare provider's identity to its security node. The public key can be registered, or "pinned," to the security node. Upon registration, the healthcare provider's security node can choose a random value $u_h$ such that $u_h \in Z_{\phi(p)}^*$. The value $u_h$ can be kept secret and is used to generate a blinding function $b_h( )$.

To join a database d, a provider h causes its security node to send $u_h$ to the security node of database d. The security node of d then calculates a value $v_d = (r_d - u_h) \mod \phi(p)$. The value $v_d$ can be kept secret and is used to generate a completion function $c_h( )$. These blinding-completion functions can be constructed in such a way that: (1) each blinding function for each provider h produces a different pseudo-random identifier $LPID_h$ for each patient; and (2) each completion function for each provider h to each database d maps each $LPID_h$ to $APID_d$.

If a health care provider h participates in multiple databases, it uses the same $LPID_h$ identifiers, but each database d will generate different $APID_d$ identifiers. Conversely, when multiple providers contribute medical data to a database, each provider h has different $LPID_h$ identifiers and the database d has the same $APID_d$ identifiers. To preserve privacy, no provider knows any of the $APID_d$ values, and no database knows any of the $LPID_h$ values. The patient identifier equivalence pairs ($LPID_h$, $APID_d$) are only known to, or computed by, security nodes.

Contribution of Patient Profiles

Medical providers may contribute patient profiles to a database. A profile contains demographic and medical information of interest to researchers. For example, a patient profile might include age, medical diagnosis codes and dates, occupation, ethnicity, treatment history, and other target characteristics. Existing standards for storing digital medical records can be used.

To contribute a profile to a database d, a health care provider h can perform several steps.

First, the provider hashes the patient's UID, w, with a standard, widely available hash function such as SHA256, to generate a value x that it sends to its security node. The security node then applies the blinding function for that health care provider to x, resulting in the value $LPID_h$. The security node returns $LPID_h$ to the health care provider, and h adds it to the patient's medical record.

Second, the provider generates a random transaction number t. The relevant profile data m is then composed into a message (h, t, m, d) and sent to the database d. In some embodiments, the medical data will only be added to the database after it is authenticated by the database's security node.

Third, the provider creates a token (such as a JSON web token) containing the quadruple ($LPID_h$, h, t, d) and signs it using its secret key. The provider sends the signed token to the provider's security node, which then authenticates the signature using the health care provider's public key and appends its own signature to the token.

The provider's security node sends token ($LPID_h$, h, t, d) to the security node of database d which does the following steps: (1) authenticates the signature of the health care provider's security node; (2) verifies that the health care provider's name h in the token matches the name in the message; (3) applies the appropriate completion function $c_h( )$ to $LPID_h$ to generate $APID_d$; (4) creates a new token ($APID_d$, p, t, d), signs, and sends it to database d.

Database d receives the token ($APID_d$, h, t, d) and then performs these steps: (1) authenticates the signature of its own security node; (2) finds the message (h, t, m, d) with the same transaction number t; (3) verifies that the health care provider's name h in the message matches the health care provider's name in the token; and (4) adds the medical data m, the provider h, and $APID_d$ to its data store. If there is an existing record with $APID_d$, the new data is linked to the existing record.

Accessing Medical Data for Research

A researcher can connect to a database and search for patient profiles that match desired criteria for the study. Upon approval by an appropriate medical research ethics board, the researcher can then requisition specific medical data from the database that is relevant to the research being conducted.

Upon receiving an approved request for medical data related to a patient profile, the database then retrieves from its database the patient medical data that meets the researcher's specific criteria.

When releasing data to a researcher, the identifier for each record, $APID_d$, should be removed or hashed with a one way function such as SHA256. Researchers are not security experts. Therefore, they should not be trusted to keep the $APID_d$ identifiers private.

Threat Analysis

The system we describe, like all such systems, does not confer perfect security. If a security node were compromised, an attacker might learn the secret values $r_d$, $u_h$, or $v_h$. These secret values could enable an attacker to recover some or all of the blinding-completion functions $b(\ )$, $b_h(\ )$, or $c_h(\ )$ and their inverses. Having one or more of these inverse functions could give an attacker who possesses $APID_d$ the ability to calculate $LPID_h$ or x, the hash of the patient's UID. While it is not practical to invert the hash function used to generate x, an attacker could test whether a known UID value, when hashed, equals x.

Assume an attacker gathers medical data from researchers. This data would contain hashes of the $APID_d$ for each record. If the attacker additionally compromises health care providers and security nodes, it is conceivable that they could eventually link a UID to anonymous research data. Given UID and $r_d$, an attacker can calculate $APID_d$, hash this value and then compare it to the data collected from researchers. The difficulty of such an attack is high because it requires compromising at least one health care provider and at least one security node of a database containing data from that health care provider within a limited time frame (the key rotation period). Moreover, if such an attack were to succeed, it would likely deanonymize only a limited number of medical records, especially if there are many independent health care providers, databases, and security nodes.

The security nodes described in this system only need to communicate with other security nodes and with the medical providers or databases they serve. Consequently, a firewall can protect each security node so that it only communicates with systems on an "allow" list. This type of protection increases the difficulty of breaching a security node because even if the system has vulnerabilities, an attacker needs to gain access to a system on a security node's "allow" list even to commence a remote attack on the security node.

We believe that the difficulty of attacking our proposed system is sufficiently high, and the profitability sufficiently low, that attackers would prefer to attack health care providers directly and aggregate data via UID. Therefore, our proposed system does not materially increase the risk of private medical data being exposed in a data breach versus the status quo.

CONCLUSION

We have presented a new cryptographic technique called blinding-completion pairs and demonstrated how they could be used to enable the sharing of private data without revealing personally identifiable information (PII).

Based upon blinding-completion pairs maintained by security nodes, we have drawn a sketch of how health care providers could supply medical data to one or more databases that would aggregate data for each patient and then make those consolidated records available as anonymous data to researchers. Our system could release data for medical research in a way that protects patient PII while still enabling qualified researchers to identify records from different health care providers that belong to the same patient.

Possible areas for future work include constructing a prototype system, developing new blinding-completion functions with improved security properties, and investigating alternative sharing protocols that may offer stronger privacy guarantees in the event of data breaches.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A method for secure sharing of data, the method comprising:
providing, to a security node for a first computing device, a hashed identifier for a data source;
applying a blinding function to the hashed identifier, the blinding function generating a first blinded value dependent on the hashed identifier;
receiving, at a second computing device, the first blinded value and a set of data of the data source;
transmitting, from the second computing device to a security node of the second computing device, the first blinded value;
applying a completion function to the first blinded value, the completion function generating a second blinded value for the set of data; and
storing the set of data and the second blinded value at the second computing device, the second blinded value linking the set of data to the data source.

2. The method of claim 1, wherein the blinding function is of the form $b_u(x) = xg^u \bmod p$, wherein:
x comprises the identifier for the data source;
g comprises a primitive root value;
u comprises a secret random value selected by the security node for the first computing device; and
p comprises a safe prime value.

3. The method of claim 1, wherein the first computing device comprises a device for a healthcare provider.

4. The method of claim 1, wherein the data source comprises a medical patient.

5. The method of claim 1, wherein:
the providing step comprises transmitting, from the first computing device and to the security node for the first computing device, the hashed identifier for the data source.

6. The method of claim 1, further comprising:
generating the hashed identifier by applying a hashing function to an identifier of the data source.

7. The method of claim 6, wherein the hashing function comprises a SHA256 hashing function.

8. The method of claim 6, wherein the hashing function comprises a one-way hashing function.

9. The method of claim 1, wherein the completion function is of the form $c_v(y) = yg^v \bmod p$, wherein:
y comprises a hashed identifier for the data source;
g comprises a primitive root value;

v comprises a secret random value selected by the security node for the second computing device; and p comprises a safe prime value.

10. The method of claim 1, further comprising:
identifying another set of data stored at the second computing device with the second blinded value; and
linking the set of data to the other set of data based on the identifying.

11. The method of claim 1, further comprising transmitting, to the first computing device, the first blinded value and the set of data of the data source for storage of a set of data and linking the set of data to the data source.

12. The method of claim 1, further comprising transmitting, to the second computing device, the first blinded value and the set of data of the data source for storage of the set of data and linking the set of data to the data source.

13. The method of claim 12, wherein the second computing device comprises a database configured for storing medical records.

14. The method of claim 1, further comprising associating an additional set of data of the data source with the second blinded value.

15. The method of claim 14, wherein the set of data and the additional set of data are from different data providers.

16. The method of claim 15, wherein each data provider is a healthcare provider for the data source.

17. A system for secure data sharing, the system comprising:
(a) a first computing device configured and adapted to:
transmit a hashed identifier for a data source;
receive, in response to the transmitting, a first blinded value dependent on the hashed identifier; and
transmit the first blinded value and a set of data of the data source for storage of the set of data and linking the set of data to the data source;
(b) a security node for the first computing device configured and adapted to:
receive, from the first computing device, the hashed identifier for the data source;
generate the first blinded value dependent on the hashed identifier; and
transmit, to the first computing device, the first blinded value;
(c) a second computing device adapted and configured to:
receive, from the first computing device the first blinded value and the set of data of the data source;
transmit the first blinded value;
receive, in response to the transmitting, a second blinded value for the set of data; and
store the set of data and the second blinded value; and
(d) a security node for the second computing device configured and adapted to:
receive, from the second computing device, the first blinded value for the set of data of the data source;
apply a completion function to the first blinded value;
generate the second blinded value from the applying; and
transmit the second blinded value to the second computing device.

18. The system of claim 17, wherein the second computing device is further configured and adapted to associate another data set of the data source with the second blinded value.

19. A method for secure sharing of data, the method comprising:
receiving, from a first computing device and at a second computing device, a first blinded value for a set of data of a data source;
transmitting, from the second computing device to a security node for the second computing device, the first blinded value;
applying, by the security node, a completion function to the first blinded value, the completion function generating a second blinded value; and
transmitting the second blinded value to the second computing device for storage of the set of data and linking the set of data to the data source.

20. The method of claim 19, further comprising:
receiving an additional first blinded value for an additional set of data of the data source;
transmitting, to the security node for the second computing device, the additional first blinded value;
applying, by the security node, the completion function to the additional first blinded value; and
associating the additional first blinded value with the second blinded value;
wherein the associating step consolidates the set of data of the first blinded value and the additional set of data of the additional first blinded value into the second blinded value; and
wherein, after the consolidation, the second blinded value links the set of data and the additional set of data to the data source.

* * * * *